US008009315B2

(12) United States Patent
    Okamoto

(10) Patent No.: US 8,009,315 B2
(45) Date of Patent: Aug. 30, 2011

(54) INFORMATION MANAGEMENT APPARATUS AND METHOD, IMAGE FORMING SYSTEM APPARATUS AND METHOD, AND COMPUTER READABLE MEDIUM AND COMPUTER DATA SIGNAL FOR DOCUMENT INFORMATION

(75) Inventor: Hitoshi Okamoto, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1091 days.

(21) Appl. No.: 11/822,254

(22) Filed: Jul. 3, 2007

(65) Prior Publication Data
   US 2008/0130053 A1    Jun. 5, 2008

(30) Foreign Application Priority Data

Nov. 30, 2006  (JP) ................................. 2006-323790

(51) Int. Cl.
   *G06K 15/00*      (2006.01)
   *G06F 3/12*       (2006.01)
(52) U.S. Cl. ...................................... 358/1.17; 358/1.16
(58) Field of Classification Search ................... 358/1.1, 358/1.9, 1.13, 1.14, 1.15, 1.17, 1.18, 3.29, 358/538–540, 1.16; 382/100
   See application file for complete search history.

(56) References Cited

U.S. PATENT DOCUMENTS

| 7,366,980 B2* | 4/2008 | Small ............................ 715/248 |
| 2006/0203314 A1* | 9/2006 | Onishi .......................... 358/540 |
| 2007/0064036 A1* | 3/2007 | Hasuike ......................... 347/16 |
| 2007/0171452 A1* | 7/2007 | Matsunoshita ............. 358/1.14 |

FOREIGN PATENT DOCUMENTS
JP    A-2002-240387    8/2002

* cited by examiner

*Primary Examiner* — Gabriel Garcia
(74) *Attorney, Agent, or Firm* — Oliff & Berridge, PLC

(57) ABSTRACT

An information management apparatus comprises: an assignment unit that uniquely assigns a region on an imaginary plane for a page of a document that is output by an image forming apparatus; a receiving unit that receives a request for assignment by the assignment unit, and identification information that identifies the document; a notification unit that notifies the image forming apparatus of coordinate values in a region assigned by the assignment unit, as coordinate values expressed on the document image of the page using a predetermined code; a storage unit that stores, for each region assigned by the assignment unit, region information that indicates the region and the identification information, the region information and the identification information being stored associated with each other; and a search unit that, when a coordinate value is input, searches for the identification information associated with the region that includes the coordinate value in the storage unit.

16 Claims, 10 Drawing Sheets

| REGION INFORMATION | JOB ID | PAGE NUMBER |
|---|---|---|
| ( 0, 0)~(149,199) | 1 | 1 |
| ( 0,200)~(199,499) | 2 | 1 |
| (150, 0)~(299,199) | 1 | 2 |
| ( 0,500)~(199,799) | 1 | 3 |

| REGION INFORMATION | JOB ID | PAGE NUMBER |
|---|---|---|
| ( 0, 0)~(149,199) | 1 | 1 |
| ( 0,400)~(199,699) | 2 | 1 |
| (150, 0)~(299,199) | 1 | 2 |
| (200,400)~(399,699) | 1 | 3 |

FIG. 11A
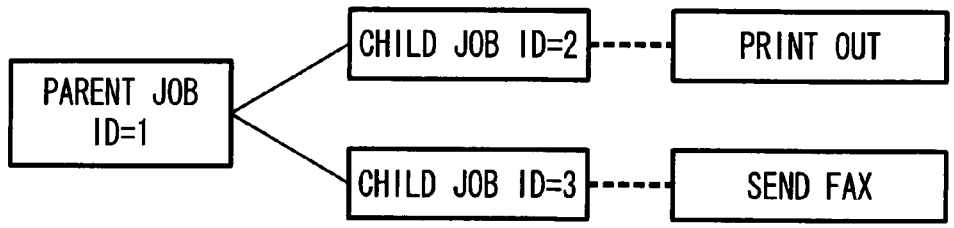
FIG. 11B
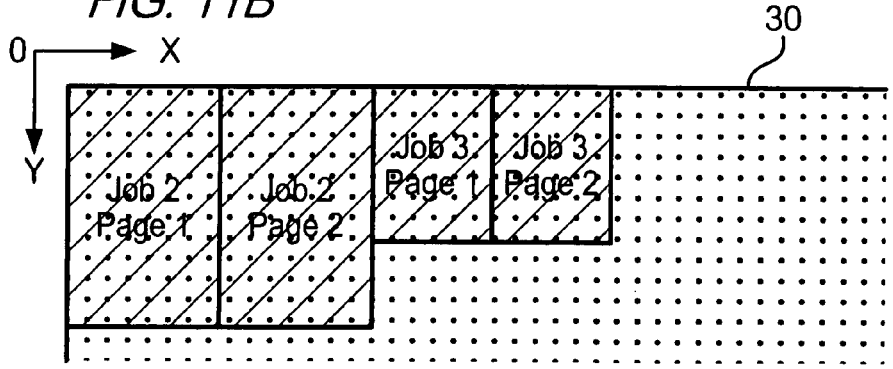
FIG. 11C
| REGION INFORMATION | PARENT JOB ID | CHILD JOB ID | PAGE NUMBER |
|---|---|---|---|
| (0,0)~(199,299) | 1 | 2 | 1 |
| (200,0)~(399,299) | 1 | 2 | 2 |
| (400,0)~(549,149) | 1 | 3 | 1 |
| (550,0)~(699,149) | 1 | 3 | 2 |
103a
FIG. 12
103a
| REGION INFORMATION | JOB ID | PAGE NUMBER | REFERENCE INFORMATION |
|---|---|---|---|
| (0,0)~(199,299) | 1 | 1 | − |
| (200,0)~(399,299) | 1 | 2 | PAPER JAM |
| (600,0)~(799,299) | 1 | 2 | − |
| (400,0)~(599,299) | 1 | 3 | − |

INFORMATION MANAGEMENT APPARATUS AND METHOD, IMAGE FORMING SYSTEM APPARATUS AND METHOD, AND COMPUTER READABLE MEDIUM AND COMPUTER DATA SIGNAL FOR DOCUMENT INFORMATION

CROSS-REFERENCE TO RELATED APPLICATIONS

This application is based on and claims priority under 35 USC 119 from Japanese Patent Application No. 2006-323790 filed on Aug. 24, 2006.

BACKGROUND

1. Technical Field

The present invention relates to an information management apparatus and an image forming system.

2. Related Art

There have been known techniques for printing a certain visible or invisible code(s) on a paper face on which a document is printed. Using the code by a computer, it is possible to share or edit the document data by other computers in a network.

SUMMARY

According to an aspect of the invention, there is provided an information management apparatus that includes: an assignment unit that uniquely assigns a region on an imaginary plane for each page of document that is output by an image forming apparatus; a receiving unit that receives a request for assignment by the assignment unit, and identification information that identifies the document; a notification unit that notifies the image forming apparatus of coordinate values in a region assigned by the assignment unit, as coordinate values expressed on the document image of that page using a predetermined code; a storage unit that stores, for each region assigned by the assignment unit, region information that indicates the region and the identification information, the region information and the identification information being stored associated with each other; and a search unit that, when a coordinate value is input, searches for the identification information associated with the region that includes the coordinate value in the storage unit.

BRIEF DESCRIPTION OF THE DRAWINGS

Exemplary embodiments of the present invention will be described in detail based on the following figures, wherein:

FIGS. 11A to 11C are diagrams for illustrating the coordinate value (X, Y) assignment process, and the configuration of the database 103a (Specific Example 4); and FIG. 12 is a diagram showing, by way of example, various information registered in the database 103a when the assignment process was performed again for a page that was not properly output due to a problem such as a paper jam or send error.

DETAILED DESCRIPTION

The following is an explanation of exemplary embodiments of the present invention, with reference to the accompanying drawings.

Figure 1:
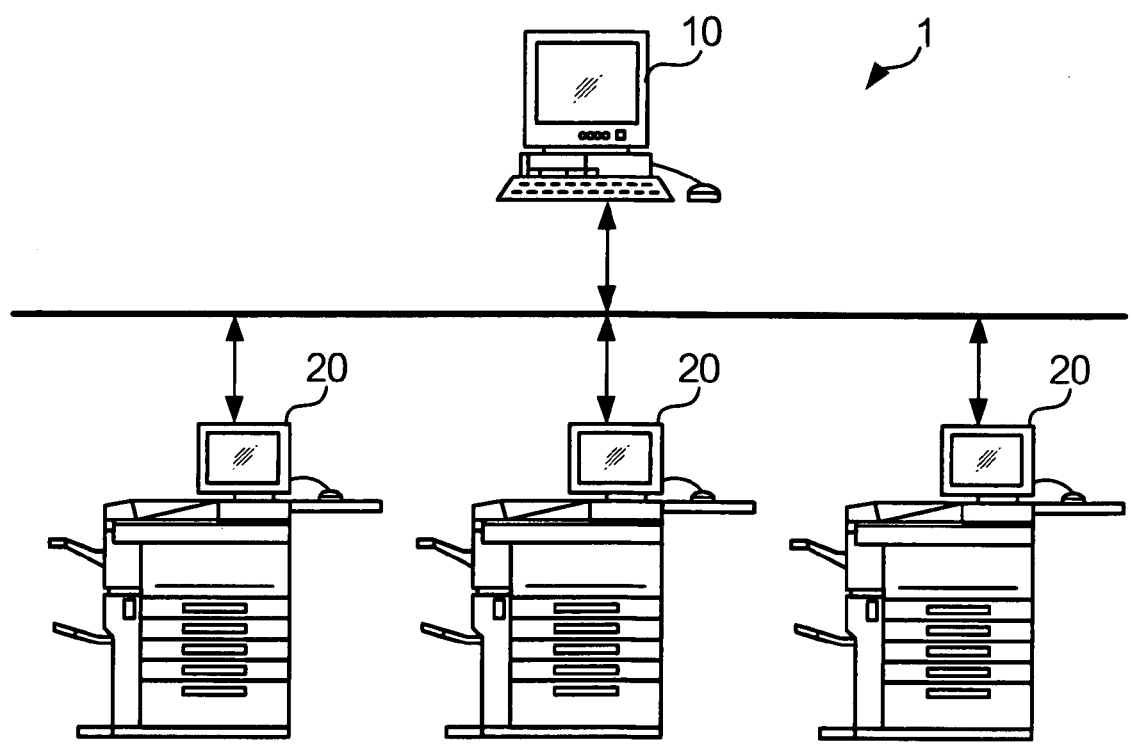
FIG. 1 is a diagram showing an example configuration of an information management system 1.

FIG. 1 is a diagram showing an example configuration of an information management system 1.

In FIG. 1, a management server 10 and image forming apparatuses 20 are, for example, connected via a network such as a LAN or the Internet. The management server 10 manages document output by an image forming apparatus 20. Also, the image forming apparatus 20, for example, is a printer, copy machine, or facsimile device provided with a network communications function.

For example, when the image forming apparatus 20 is a printer provided with a network communications function, in the image forming apparatus 20, a print job (including document to be printed, print conditions for the document, and the like) is received from a personal computer or the like not shown in FIG. 1, and based on this print job a document image is formed and printed on paper. Alternatively, when the image forming apparatus 20 is a copy machine provided with a network communications function, in the image forming apparatus 20, for example, an image captured from a document is printed (copied) on paper, and the image information captured from the original is sent to a designated counterpart device via a network such as a LAN or the Internet. Alternatively, when the image forming apparatus 20 is a facsimile device provided with a network communications function, in the image forming apparatus 20, image information of a facsimile original received from a counterpart device via a telephone network not shown in FIG. 1 is printed on paper, and the image information of the facsimile original captured from the original is sent to a designated counterpart device via a telephone network.

Note that the image forming apparatus 20 may also be a multifunction machine provided with a printer function, a copy function, a facsimile function, and a network communications function. Also, the image forming apparatus 20 can perform printing on a paper-like recording material other than paper, e.g., a recording material made from plastic, cloth, or the like.

Figure 2:
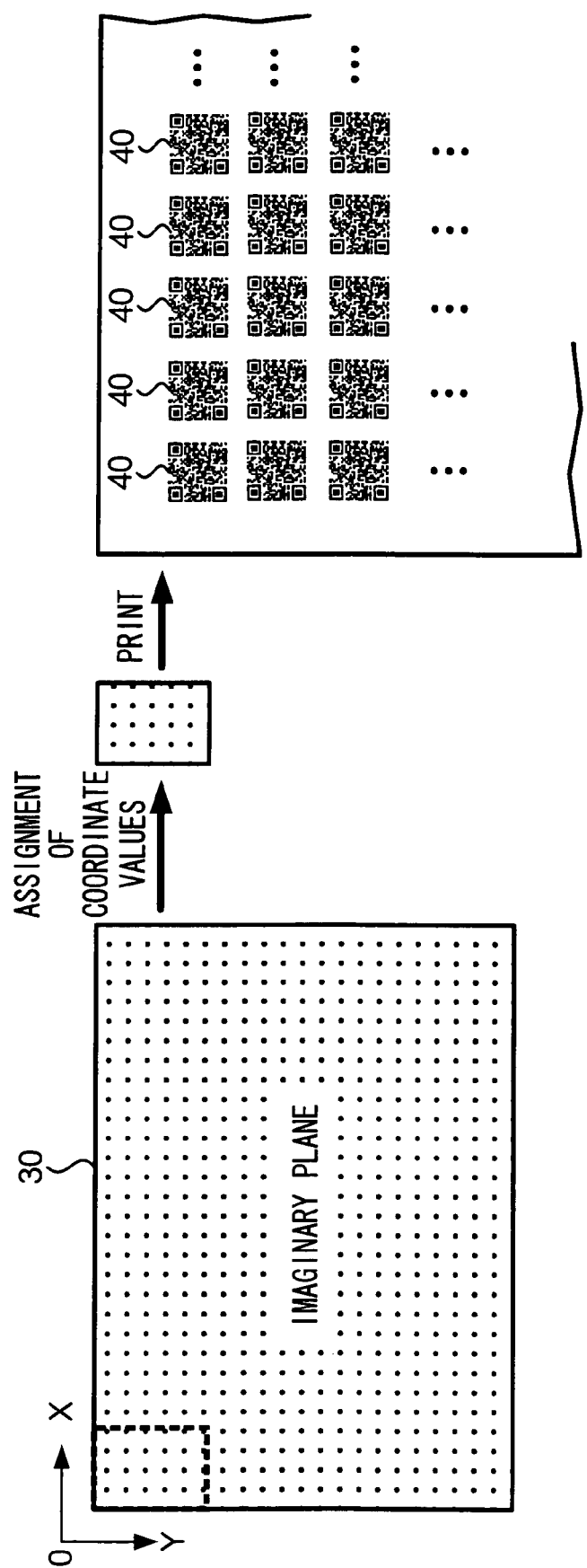
FIG. 2 is a diagram showing the relationship between an imaginary plane 30, coordinate values (X, Y), and two-dimensional codes 40.

In the information management system 1, as shown in FIG. 2, the document output by each image forming apparatus 20 is managed using coordinate values (X, Y) indicating a position on a very wide imaginary plane 30. The dots on the imaginary plane 30 shown in FIG. 2 correspond to individual coordinate values (X, Y). When any image forming apparatus 20 outputs document, as shown in FIG. 2, a region on the imaginary plane 30 is uniquely assigned to each page of the document that is output, and when, for example, printing the document, each of the coordinate values (X, Y) in this region is, for example, printed in a matrix on the document image of the corresponding page as a visible or invisible two-dimensional code 40.

The two-dimensional code 40 is an image obtained by encoding a coordinate value (X, Y) on the imaginary plane 30, and for example, a QR Code, a Data Matrix, a Maxi Code, or the like can be used for the two-dimensional code 40. Also, an invisible two-dimensional code 40 is printed by an image forming apparatus 20 using a color material made of a near-infrared absorbing dye such as, for example, a carbon black or cyanine dye, an immonium dye, a diimmonium dye, a triallylmethane dye, or the like.

Figure 3:
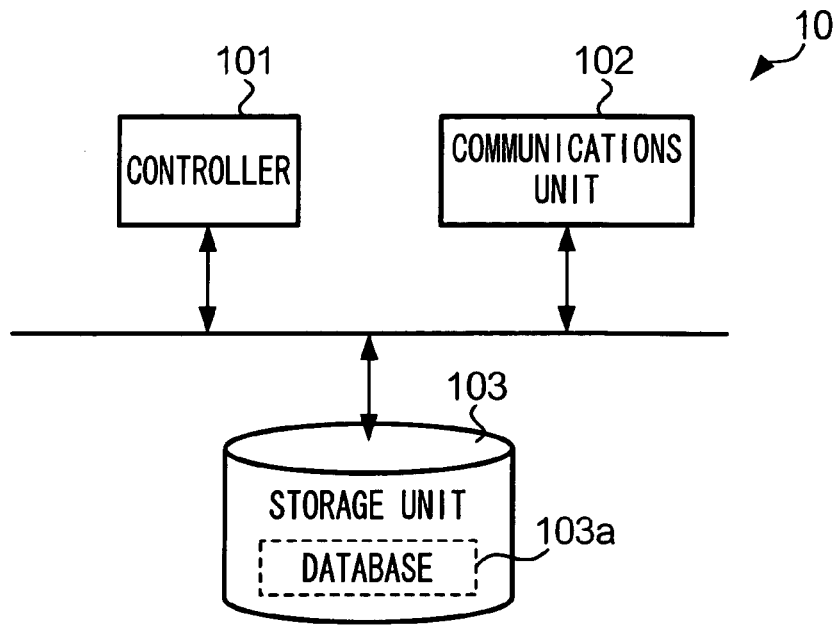
FIG. 3 is a block diagram showing an example configuration of a management server 10.

FIG. 3 is a block diagram showing an example configuration of the management server 10.

In FIG. 3, a controller 101 is provided with a CPU, a ROM, a RAM, and the like, and controls each unit of the management server 10 by executing a program stored in a storage unit 103. A communications unit 102 controls communications performed with each of the image forming apparatuses 20. The storage unit 103 is, for example, a hard disk, and stores a large number of the coordinate values (X, Y) on the imaginary plane 30 shown in FIG. 2, a database 103a described below, and the like. The management server 10 may be further provided with an operating unit configured from a keyboard, a mouse, and the like, and a display configured from a CRT, a LCD, or the like.

With the management server 10, by performing communications with the image forming apparatus 20, it is possible to acquire, for example, the following information (1) to (7) with respect to document that is output by an image forming apparatus 20. Of course, the management server 10 can also acquire the document itself that is output from the image forming apparatus 20.

(1) A document ID (identification information uniquely assigned to an document file name, or the document)
(2) An application ID (identification information unique to application software capable of using the document)
(3) A user ID (identification information unique to a user that instructed output of the document)
(4) A job ID (identification information uniquely assigned to a job in which the document has been included)
(5) A page number (page number of the document)
(6) A paper size (size of paper used when printing the document)
(7) Address information indicating a storage location (address information indicating the location where the document is stored, such as, for example, "\\IP address\drive name\folder name")

Also, the management server 10, based on this information (1) to (7) received from the image forming apparatus 20, assigns a region on the imaginary plane 30 in page units to the document that is output, and for each assigned region, registers region information indicating a range of regions, and information related to the document (for example, a page number, a document ID, an application ID, a user ID, a job ID, address information indicating a storage location, and the like), associated in the database 103a.

Figure 4:
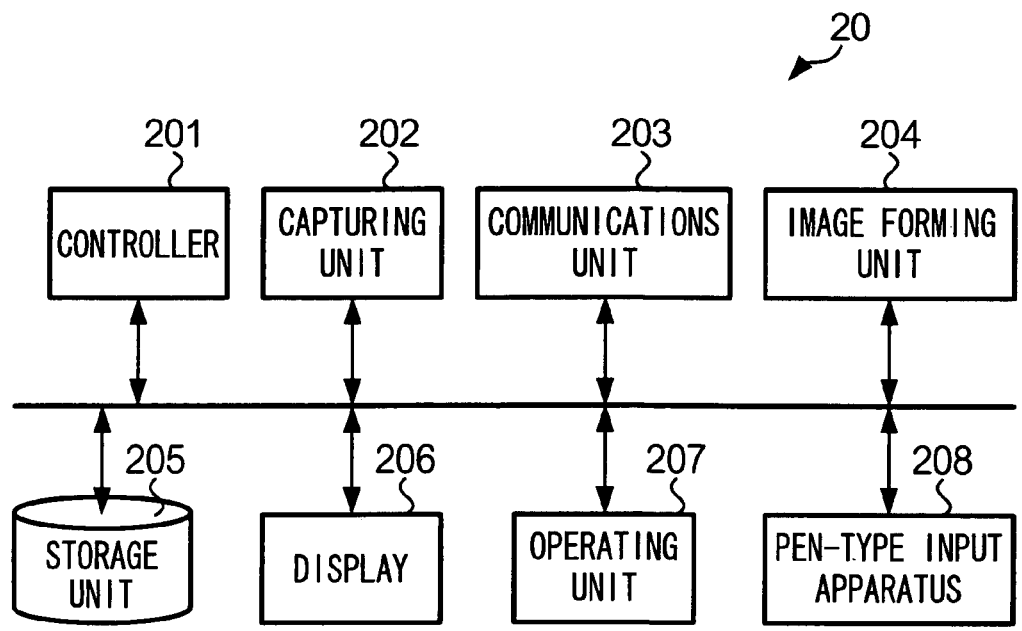
FIG. 4 is a block diagram showing an example configuration of an image forming apparatus 20.

FIG. 4 is a block diagram showing an example configuration of an image forming apparatus 20.

In FIG. 4, a controller 201 is provided with a CPU, a ROM, a RAM, and the like, and controls each unit of the image forming apparatus 20 by executing a program stored in a ROM or a storage unit 205. A capturing unit 202, for example, is an image scanner that optically captures an image of a document. A communications unit 203 controls communications performed between the image forming apparatus 20 and the management server 10, a personal computer, or the like. An image forming unit 204, for example, prints image information of a document captured with the capturing unit 202 onto paper, or forms an image of a document based on a print job received with the communications unit 203 and prints that image onto paper. The storage unit 205, for example, is a hard disk, and programs, information, and the like are stored in the storage unit 205. A display 206 is configured from a liquid crystal display panel. An operating unit 207 includes a touch panel affixed on a screen of the liquid crystal display, and operators such as a numeric keypad and a start button. The operating unit 207 outputs an operating signal corresponding to operation of the touch panel or an operator to the controller 201.

Also, the image forming apparatus 20 is provided with a pen-type input apparatus 208 separate from the operating unit 207. The pen-type input apparatus 208, for example, is equipped with a compact camera, and when a user holds the pen-type input apparatus 208 and performs a writing operation in a state with the pen tip in contact with a paper face, the compact camera captures an image of the paper face in the vicinity of the pen tip, and then sends the captured image information to the image forming apparatus 20. The pen-type input apparatus 208 may also have a storage unit. In this case, codes or coordinate values of which an image was captured can be temporarily stored in the pen-type input apparatus 208, and afterward sent collectively to the image forming apparatus 20.

Also, the image forming apparatus 20, in addition to a function to generate a two-dimensional code 40 by encoding coordinate values (X, Y), is provided with a function to identify a two-dimensional code 40 included in a document image captured by the capturing unit 202, or a two-dimensional code 40 included in a captured image received from the pen-type input apparatus 208, using an image recognition process, and decode this two-dimensional code 40 to obtain coordinate values (X, Y).

Figure 5:
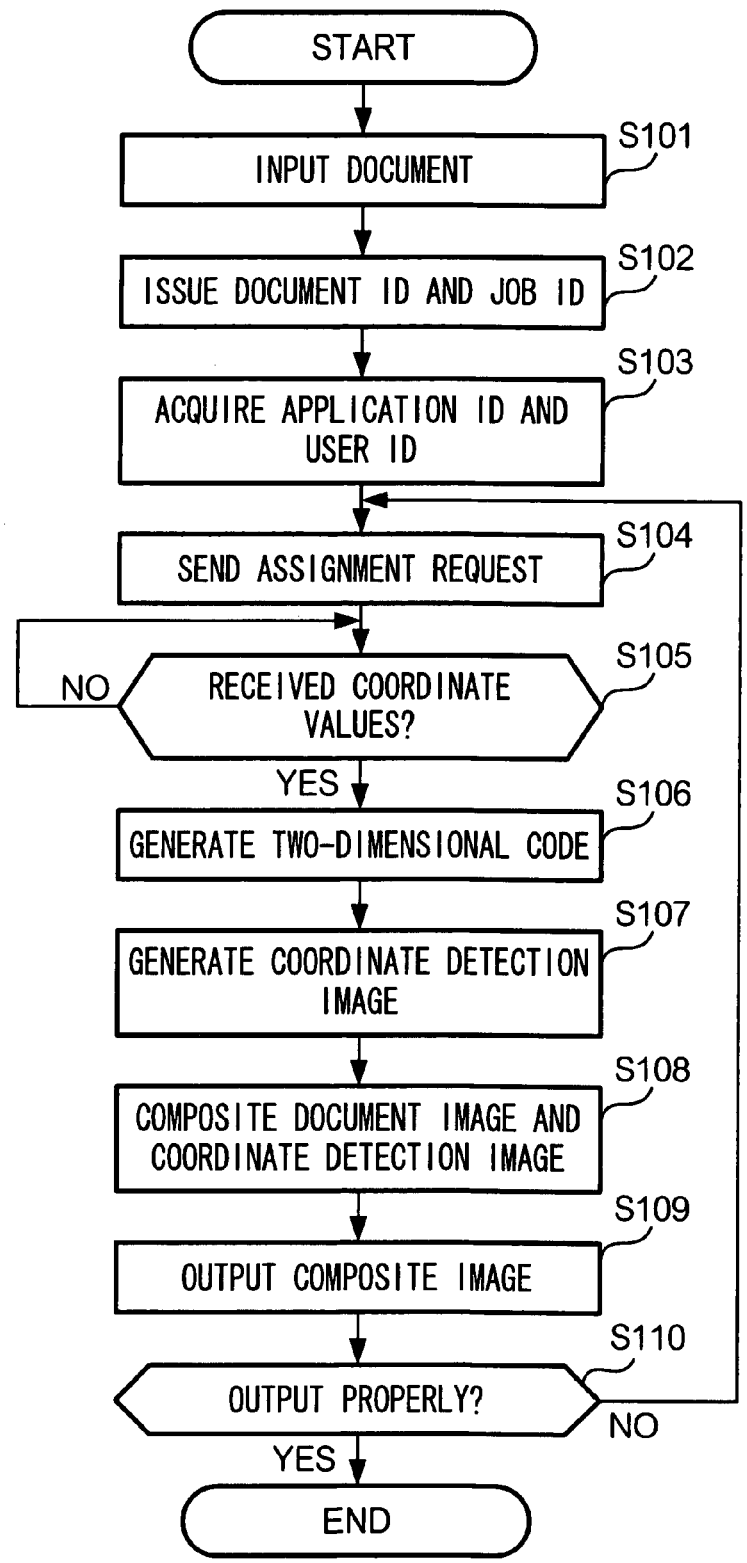
FIG. 5 is a flowchart showing an example of the operation of the image forming apparatus 20.

FIG. 5 is a flowchart showing an example of the operation of the image forming apparatus 20.

In FIG. 5, first, in the image forming apparatus 20, for example, a print job that includes document is received from a personal computer, image information of the original is captured using the capturing unit 202, image information of a facsimile original is received from a counterpart apparatus, or the like, and thus document is imported (Step S101).

Next, the image forming apparatus 20 issues a document ID or job ID for the imported document (an ID may also be issued by a personal computer) (Step S102), and acquires an application ID or user ID (Step S103). Here, with respect to the document ID or job ID, for example, a uniquely identifiable identification number may be assigned to the document or the job. Also, in the case of, for example, document received from a personal computer, the application ID or user ID can be acquired from the properties or the like of the document.

Next, the image forming apparatus 20 sends a request to the management server 10 to assign coordinate values (X, Y) for the document imported in Step S101 (S104). In Step S104, as information necessary for performing the process of assigning the coordinate values (X, Y) and a process of registering the coordinate values (X, Y) to the database 103a in the management server 10, information for identifying the original and information related to the document, such as a document ID, an application ID, a user ID, a job ID, a page number, a paper size, and address information that indicates a storage location, is sent along with the assignment request. Of course, a configuration may also be adopted in which the document itself is sent along with the assignment request. Also, the assignment request, with respect to the document that is output, may be sent in one page units, or may be sent in units of multiple pages, such as five pages or ten pages.

In the management server 10, the process of assigning the coordinate values (X, Y) and the process of registering the coordinate values (X, Y) to the database 103*a* are performed in response to the assignment request from the image forming apparatus 20, and these processes performed in the management server 10 will be described separately with reference to the figures.

Figure 6:
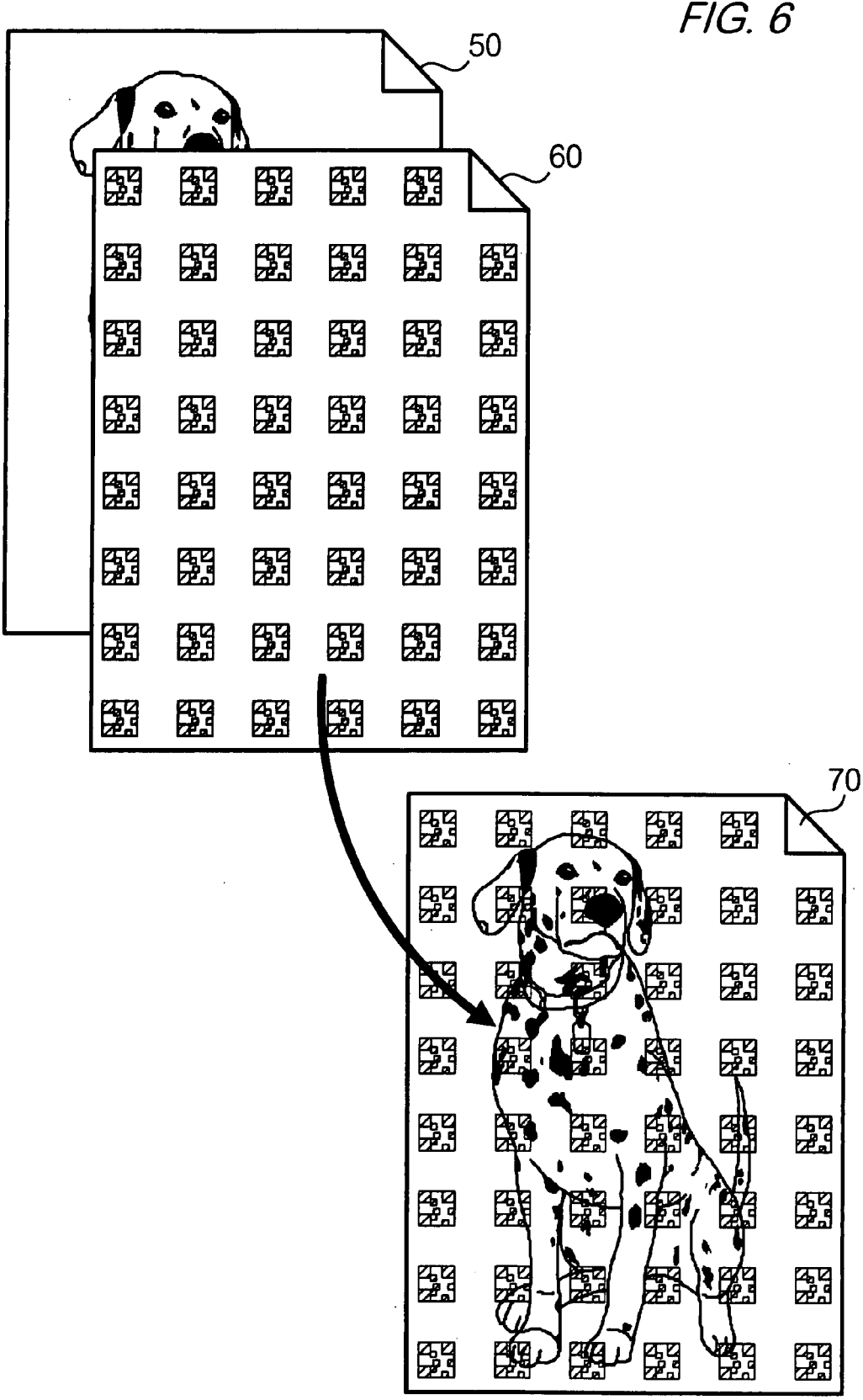
FIG. 6 is a diagram showing, by way of example, a document image 50, a coordinate detection image 60, and a composite image 70 for output.

In the image forming apparatus 20, after the assignment request is sent, the response from the management server 10 is monitored, and when each of the coordinate values (X, Y) that have been assigned to each page of the document are received (Step S105: YES), first, each of the received coordinate values (X, Y) are encoded to generate two-dimensional codes 40 (Step S106). Next, the image forming apparatus 20, for example, as shown in FIG. 6, generates a coordinate detection image 60 in which each of the generated two-dimensional codes 40 are, for example, arranged in a matrix (Step S107). When the number of pages of the document is two pages or more, a coordinate detection image 60 is generated for each page.

Afterward, the image forming apparatus 20 forms a document image based on the document imported in Step S101, and composites the document image with the coordinate detection image 60 generated in Step S107 (Step S108). For example, as shown in FIG. 6, a document image 50 showing a dog is composited with the coordinate detection image 60, thus generating a composite image 70 for output. In FIG. 6, for the sake of convenience, the two-dimensional codes 40 are shown with a somewhat large size relative to the size of the paper, but in actuality, the size of individual two-dimensional codes 40 is extremely small, and an extremely large number of the two-dimensional codes 40 are arranged in a matrix on one sheet of paper. Further, other than image information as shown in FIG. 6, the document may also be text information, form information, or the like.

With respect to compositing of the document image 50 and the coordinate detection image 60, for example, a configuration may be adopted in which a specific tone or color hue is removed from the document image 50, the coordinate detection image 60 is generated using the removed tone or color hue, and these two images are composited to generate the composite image 70 for output.

Afterward, the image forming apparatus 20 outputs the composite image 70 (Step S109). For example, when a print job was received from a personal computer, or when image information of a document to be copied was captured, or alternatively, when image information of a facsimile original from a counterpart apparatus was received via a telephone network, the composite image 70 is printed onto paper by the image forming unit 204. Also, for example, when facsimile transmission or the like of the captured image information has been instructed, the composite image 70 is sent to a counterpart apparatus by the communications unit 203.

A configuration may also be adopted in which, without generating the composite image 70, the document image 50 and the coordinate detection image 60 are printed overlapping on the same paper face, thus compositing the document image 50 and the coordinate detection image 60 on the paper face. In such a case, the document image 50 and the coordinate detection image 60 may be printed using color materials with respectively differing optical properties. Likewise, a configuration may be adopted in which when sending a facsimile or the like as well, the document image 50 and the coordinate detection image 60 are sent without sending the composite image 70, and when printing is performed in the counterpart apparatus, the document image 50 and the coordinate detection image 60 are printed overlapping.

Also, when printing invisible two-dimensional codes, in the image forming apparatus 20, the coordinate detection image 60 is printed using, for example, a color material made of a near-infrared absorbing dye such as, for example, a carbon black or cyanine dye, an immonium dye, a diimmonium dye, a triallylmethane dye, or the like.

Afterward, the image forming apparatus 20 determines whether or not proper output of the composite image 70 has finished without occurrence of a problem such as a paper jam or a send error (Step S110). As a result, when proper output has finished (Step S110: YES), the image forming apparatus 20 ends the process shown in FIG. 5. On the other hand, when a problem such as a paper jam or a send error occurred, so that with respect to the document, for example the composite image 70 of any one or more pages was not properly output (Step S110: NO), the image forming apparatus 20, returning to Step S104, only with respect to a page of the document that was not properly output, again sends a request for assignment of coordinate values (X, Y) to the management server 10. Also, at this time, with respect to the document for which the assignment process is performed again, a document ID (or job ID), the page number of pages that were not properly output, and the like are sent along with the assignment request.

When, in this manner, a problem such as a paper jam or a send error occurred and an assignment request was sent again, the image forming apparatus 20, when the newly assigned coordinate values (X, Y) for a page that was not properly output are received (Step S105: YES), again executes the processes indicated in Steps S106 to S109 for only the page that was not properly output, and outputs the composite image 70.

Figure 7:
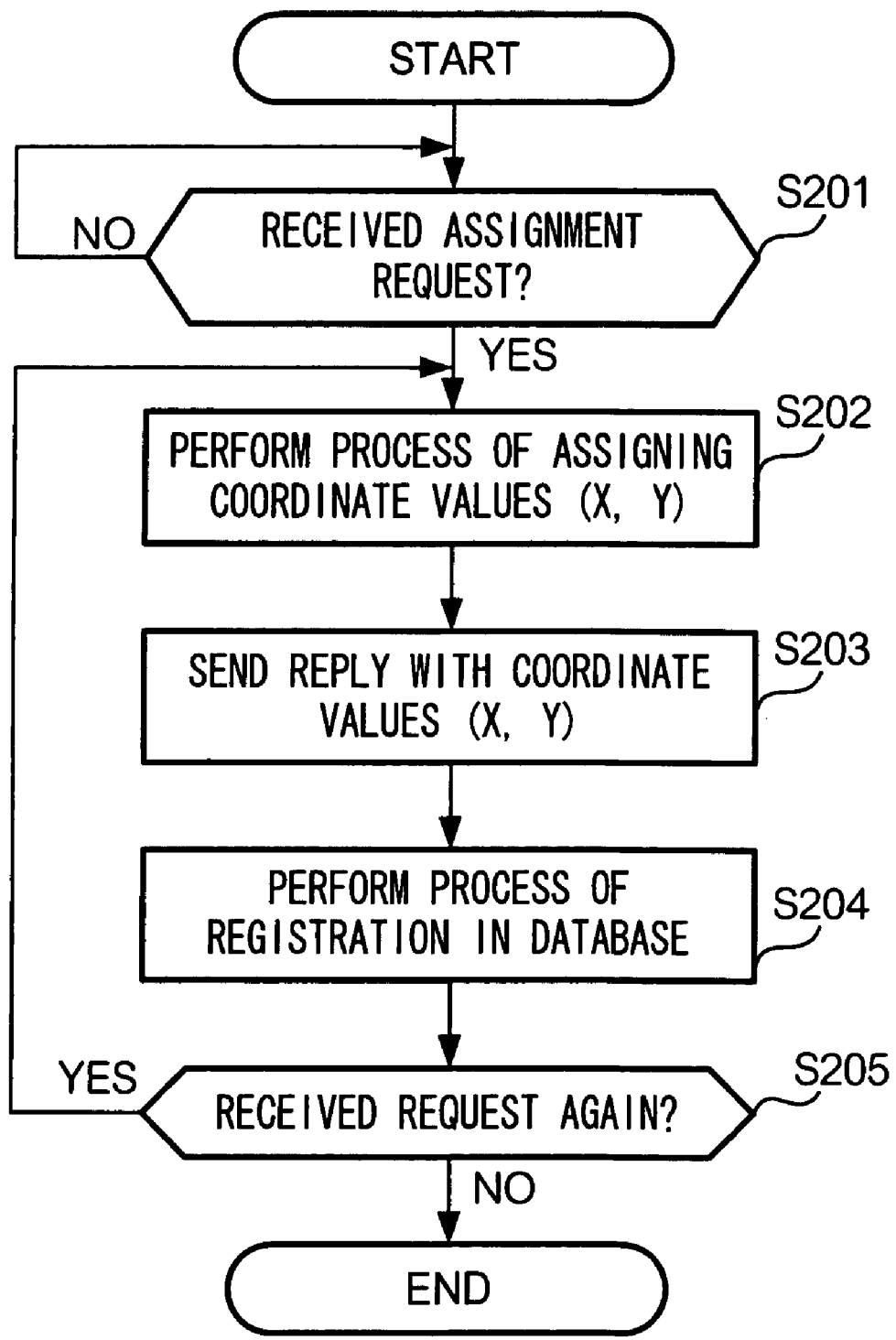
FIG. 7 is a flowchart showing an example of the operation of the management server 10.

FIG. 7 is a flowchart showing an example of the operation of the management server 10.

As shown in FIG. 7, in the management server 10, when a request for assignment of coordinate values (X, Y) is received from any of the image forming apparatuses 20 (Step S201: Yes), a region on the imaginary plane 30 is uniquely assigned to each page of the document output by this image forming apparatus 20 (Step S202). Also, in Step S201, as information related to the document to be output, a document ID, application ID, user ID, job ID, page number, paper size, address information indicating a storage location, and the like are received from the image forming apparatus 20 along with the assignment request. Also, in Step S202, assignment of a region is performed based on the number of pages of the document and the paper size when printing.

Next, the management server 10 notifies the image forming apparatus 20 of each of the coordinate values (X, Y) in the assigned region for each page, as coordinate values (X, Y) arranged in a matrix as visible or invisible two-dimensional codes 40 on the document image of this page (Step S203). At this time, the management server 10 may return all of the coordinate values (X, Y) that have been assigned for each page to the image forming apparatus 20, or the management server 10 may return region information that indicates the range of the region assigned for each page to the image forming apparatus 20. Afterward, the management server 10 registers region information indicating a region range for each region assigned in Step S202, and information related to the document (for example, such as a document ID, an application ID, a user ID, a job ID, a page number, a paper size, and address information indicating a storage location) received from the image forming apparatus 20, appropriately associated in the database 103a (Step S204).

Also, when a problem such as a paper jam or a send error occurred in the image forming apparatus 20, and thus an assignment request was received again for a page that was not properly output (Step S205: YES), the proves returns to Step S202, and the processes in Steps S202 to S204 are executed again for only the pages that were not properly output. More specifically, the management server 10, with respect to the pages that were not properly output, assigns a new region different from the region that has already been assigned, and notifies the image forming apparatus 20 of each of the coordinate values (X,Y) in this region. The management server 10 also registers region information indicating the range of this region, and information related to the document that was not properly output, appropriately associated in the database 103a.

The reason for assigning a new region different from the region that has already been assigned with respect to pages that were not properly output in this manner is that a case is conceivable in which, for example, when a page is determined to have been not properly output due to occurrence of a paper jam, the paper is used after removing the paper from inside the image forming apparatus 20 in order to eliminate the paper jam. In such a case, although that page is based on the same original as the page that is output again, in order to avoid assigning the same coordinate values in duplicate, a new region is assigned.

Following is a description of specific examples of the process of assigning the coordinate values (X,Y), and the process of registering them in the database 103a, performed in the management server 10.

Specific Example 1

Figures 8A, 8B:
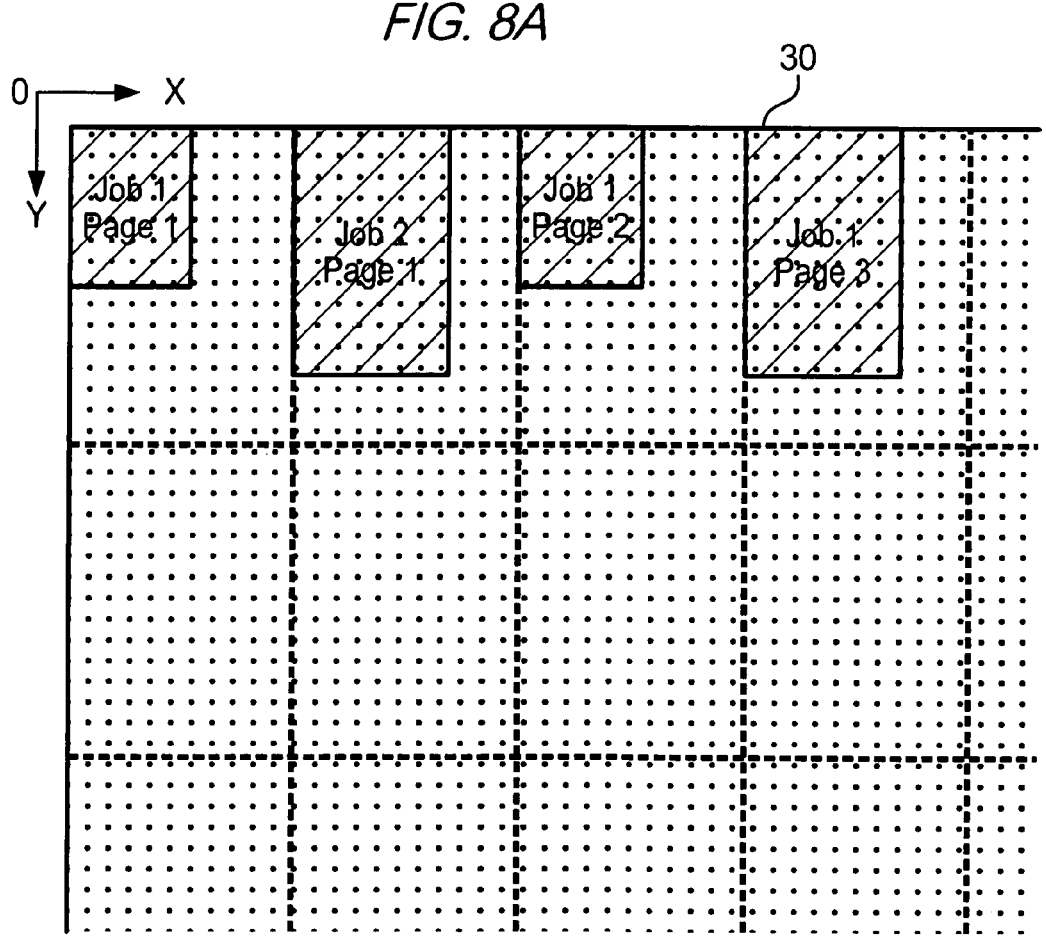
FIGS. 8A and 8B are diagrams for illustrating a coordinate value (X, Y) assignment process, and the configuration of a database 103a (Specific Example 1)

Specific Example 1, as shown in FIG. 8A, is a case in which the imaginary plane 30 managed in the management server 10 has been divided in advance using the largest paper size usable when the image forming apparatus 20 prints, and an assignment sequence has been determined in advance for each partitioned region divided in this manner. In the case of the example shown in FIG. 8A, the assignment sequence of the partitioned regions is set in the manner of left end to right end of the first line, left end to right end of the second line, left end to right end of the third line, and so on. Also, information indicating the assignment sequence of the partitioned regions that has been set in advance is stored in the storage unit 103 of the management server 10.

In the case of Specific Example 1, the management server 10, in response to an assignment request from each of the image forming apparatuses 20, according to the assignment sequence stored in the storage unit 103, assigns regions to the document in page units. The assignment sequence, as stated above, for example, is set in the manner of left end to right end of the first line, left end to right end of the second line, and so on. Also, in each of the partitioned regions, a region of the necessary range is cut out according to the paper size or the like. The example shown in FIG. 8A shows a case in which an assignment request was received from two of the image forming apparatuses 20. This example is for a case in which, from one of the image forming apparatuses 20, as a print job (Job 1), an assignment request is received for document in which the number of pages is "3", and the paper size when printing is "A4" for the first and second pages and "B4" for the third page, and from the other image forming apparatus 20, as a print job (Job 2), an assignment request is received for document in which the number of pages is "1", and the paper size when printing is "B4". Also, as shown in FIG. 8A, during the assignment process for Job 1, more specifically between the first page and the second page of Job 1, the assignment process for Job 2 is performed.

When the above sort of assignment processes have been performed, in the management server 10, when the assignment processes are finished, as shown in FIG. 8B, for each region assigned in a page unit, region information and a job ID (or a document ID) are registered associated in the database 103a. Also, in FIG. 8B, the coordinate values (X, Y) at the upper left end and the coordinate values (X,Y) at the lower right end of an assigned region are used as region information.

In the case of Specific Example 1, as shown in FIG. 8A, in each partitioned region for which the assignment process is finished, an unused region occurs if the maximum paper size is not used. That is, the coordinate values (X, Y) cannot be assigned without waste, but conversely, as shown in FIG. 8B, the information registered associated with the region information in the database 103a may be at a minimum only a job ID (or a document ID). This is because the assignment sequence for each partitioned region has been previously set and stored in the storage unit 103, and if at least a job ID (or a document ID) is registered in the database 103a, the page number can be identified using the assignment sequence registered in the storage unit 103 and the job ID (or document ID) registered in the database 103a. That is, when the configuration of Specific Example 1 is adopted, it is necessary to store the assignment sequence of each partitioned region in the storage unit 103, but it is not necessary to register page numbers in the database 103a.

Specific Example 2

Next, in Specific Example 2, the coordinate values (X, Y) on the imaginary plane 30 are assigned with as little waste as possible.

Figures 9A, 9B:
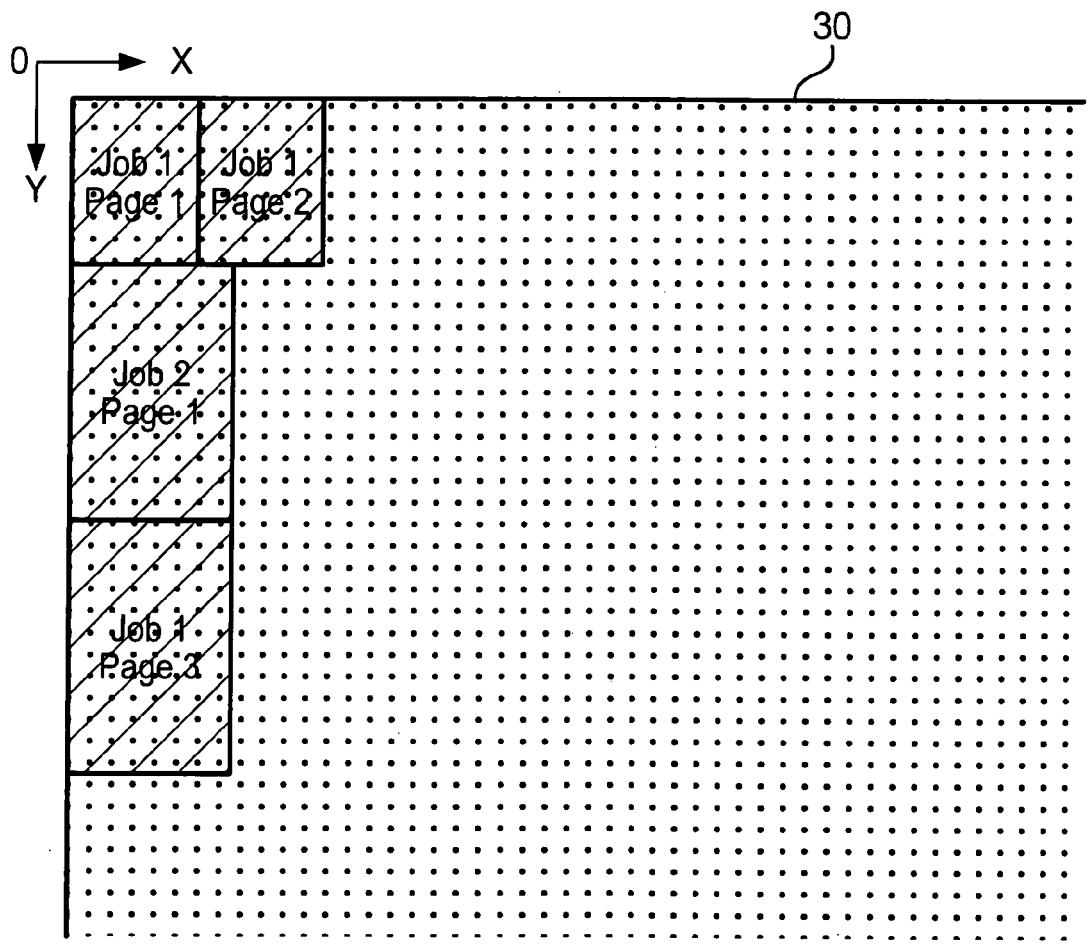
FIGS. 9A and 9B are diagrams for illustrating the coordinate value (X, Y) assignment process, and the configuration of the database 103a (Specific Example 2)

As shown in FIG. 9A, in the case of Specific Example 2, the management server 10, when assigning regions in page units to the document that is output, cuts out each region by selecting positions so that there is the least amount of unevenness, such that wasteful empty regions do not occur on the imaginary plane 30. In the example shown in FIG. 9A, same as in the case of Specific Example 1 above, the assignment process for Job 2 is performed between the first and second pages of Job 1, but at this time, in the management server 10, the region assigned to the document of Job 2 (one page only) is provided below the first page of Job 1, not between the first and second pages of Job 1. If each region is cut out without gaps merely by adopting such a configuration, it is possible to use the coordinate values (X, Y) on the imaginary plane 30 with as little waste as possible, but conversely, as shown in FIG. 9B, it is necessary to register a page number for each region assigned in a page unit in the database 103a, in addition to region information and a job ID (or a document ID).

Specific Example 3

Figures 10A, 10B:
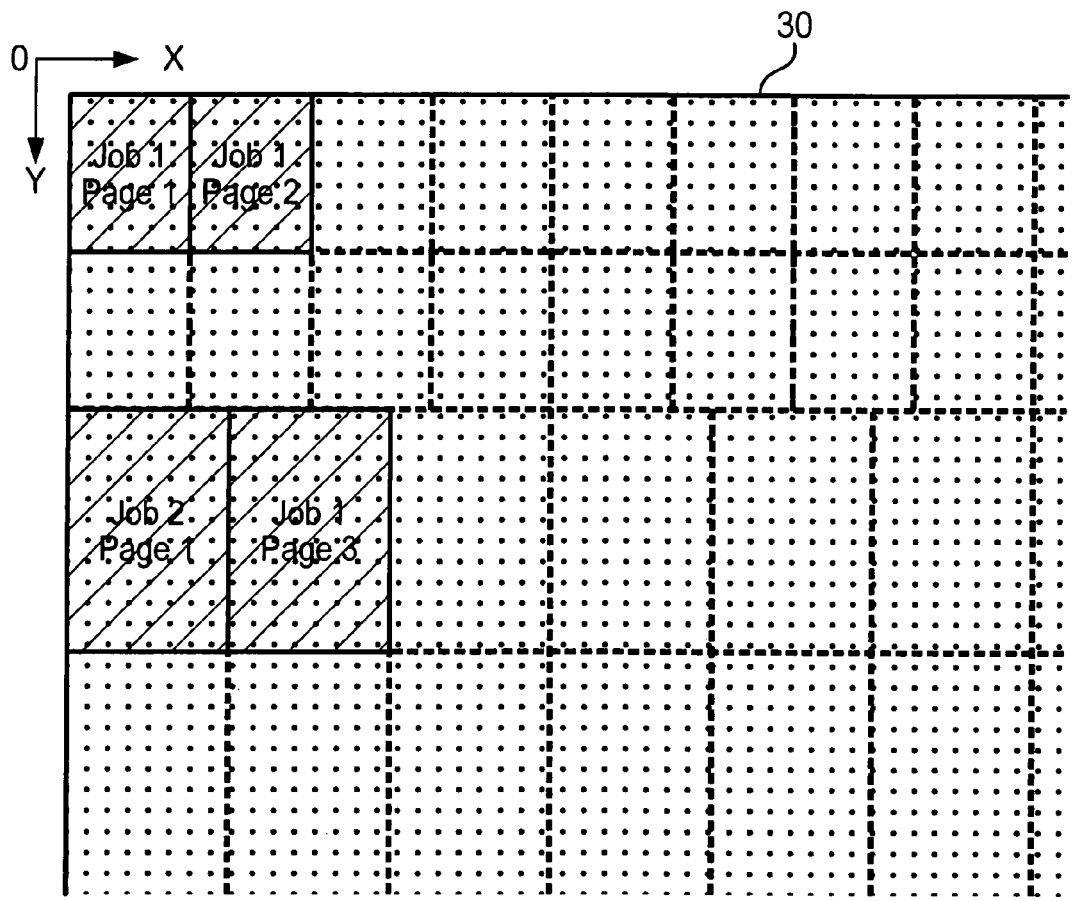
FIGS. 10A and 10B are diagrams for illustrating the coordinate value (X, Y) assignment process, and the configuration of the database 103a (Specific Example 3)

In the case of Specific Example 3, as shown in FIG. 10A, the imaginary plane 30 is divided in advance into partition regions corresponding to the paper size, for each type of paper size usable when the image forming apparatus 20 performs printing, such as, for example, A3, A4, B4, and B5-sized paper. In the management server 10, when assigning regions in page units to the document that is output, an unused partition region is selected for each page from the partition regions with a size corresponding to the paper size of that page.

In the example shown in FIG. 10A as well, same as in the case of Specific Example 1 above, with respect to Job 1, the paper size of the first and second pages is "A4", and the paper size of the third page is "B4", and with respect to Job 2 (one page only), the paper size is "B4". Also, the assignment process for Job 2 is performed between the first and second pages of Job 1. In the management server 10, when assigning a region, the paper size of that region is checked in page units, a partition region with a size corresponding to the paper size and that is unused is selected, and that partition region is used as the region that is assigned. Accordingly, it is possible to cut out each region without a gap, so the coordinate values (X, Y) on the imaginary plane 30 can be used without waste, but in the case of Specific Example 3, as shown in FIG. 10B, it is necessary to register a page number for each region assigned in a page unit in the database 103a, in addition to region information and a job ID (or a document ID).

Specific Example 4

In Specific Example 4, for example, as shown in FIG. 11A, as in a case in which one piece of document is printed out and also sent by facsimile transmission, information of related jobs, such as a parent job and a child job, can be managed collectively. In FIG. 11A, a child job of job ID=2 is a job related to printing of document, and a child job of job ID=3 is a job related to facsimile transmission of document. Also, a parent job of job ID=1 is a job that, with respect to one piece of document, instructs to perform both the child job of job ID=2 and the child job of job ID=3. Also, the number of pages of document that are printed out and sent by facsimile transmission by the above parent job and child jobs is "2".

In this case, as shown in FIG. 11B, first, the assignment process is performed for the child job (Job 2), and then, with respect to the document, regions assigned to the first and second pages in the case of printing out are cut out. Next, the assignment process is performed for the child job (Job 3), and then, with respect to the document, regions assigned to the first and second pages in the case of facsimile transmission are cut out. Also, because, as described above, the parent job (Job 1) is only for instructing to perform the process for both the child job (Job 2) and the child job (Job 3), no process for assigning a region on the imaginary plane 30 is performed for the parent job (Job 1). Also, in the example shown in FIG. 11B, the size of the region assigned in the case of printing out and in the case of facsimile transmission is changed, but the size of the region assigned may also be the same in both cases.

When the assignment process shown in FIG. 11B has been performed, in the management server 10, when the assignment process is ended, as shown in FIG. 11C, for each region assigned in a page unit, region information, a parent job ID, a child job ID, and a page number are registered associated in the database 103a. Of course, as in the case of Specific Example 1 described above, it is not necessary to register a page number in the database 103a when the region assignment sequence has been previously set in the manner of, using the upper left end of the imaginary plane 30 as a starting point, from the left end to the right end of the first line, from the left end to the right end of the second line, from the left end to the right end of the third line, and so on. When the configuration of Specific Example 4 is adopted, it is possible to collectively manage the information of related jobs, such as parent and child jobs.

In Specific Examples 1 to 4 described above, information was described that at a minimum is required to be registered in the database 103a in order to manage document using the coordinate values (X, Y) on the imaginary plane 30, but a configuration may also be adopted in which, as information related to the document, further, an application ID, a user ID, address information indicating a storage location, and the like, are registered in the database 103a associated with the region information.

Next, with reference to the database 103a registered in the management server 10 in the above manner, an example of the operation to manage document that has been output by the image forming apparatuses 20 will be described.

For example, when a user holds the pen-type input apparatus 208 and places the pen tip in contact with a paper face on which the composite image 70 has been printed, an image of the paper face in the vicinity of the pen tip is captured with a compact camera provided in the pen-type input apparatus 208, and the captured image information is sent to the image forming apparatus 20. Thus an image of a two-dimensional code 40 that is located near the pen tip is captured, and sent to the image forming apparatus 20. In the image forming apparatus 20, the two-dimensional code 40 included in the captured image received from the pen-type input apparatus 208 is identified by the image recognition process, and this two-dimensional code 40 is decoded to obtain coordinate values (X, Y). Next, the image forming apparatus 20 sends the coordinate values (X, Y) obtained in this manner to the management server 10 along with a search request.

The function to decode the two-dimensional code 40 may also be provided in the pen-type input apparatus 208. That is, a configuration may be adopted in which, in the pen-type input apparatus 208, the two-dimensional code 40 included in the captured image is identified by the image recognition process, and this two-dimensional code 40 is decoded to obtain coordinate values (X, Y). In this case, the captured coordinate values (X, Y) are sent from the pen-type input apparatus 208 to the image forming apparatus 20, not the captured image.

In the management server 10, when the search request and the coordinate values (X, Y) are received from the image forming apparatus 20, the database 103a is searched to acquire the information associated with the region including the received coordinate values (X, Y). For example, in the case of the database 103a shown in FIG. 8B, a job ID (or a document ID) can be acquired, and in addition, as described above, by referring to the assignment sequence of each partitioned region stored in the storage unit 103, it is also possible to identify a page number. Also, in the case of the database 103a shown in FIGS. 9B and 10B, a job ID (or a document ID) and a page number are acquired. In the case of the database 103a shown in FIG. 11C, a parent job ID, a child job ID, and a page number are acquired. Also, in a case in which an application ID, a user ID, address information indicating a storage location, and the like are additionally registered in the database 103a, these pieces of information are collectively acquired. Next, the management server 10 sends the information acquired in this manner to the image forming apparatus 20.

Then, in the image forming apparatus 20, when search results are received from the management server 10, the search results are displayed in the display 206. Thus, the user is notified of, for the original that the user pointed out using the pen-type input apparatus 208, a document ID and a page number, and additionally, an application ID, a user ID, address information indicating a storage location, and the like. Of course, in the image forming apparatus 20, it is also possible to acquire document using the storage location obtained in this manner, reprint the acquired document, and send the acquired document to a counterpart apparatus that has been designated by the user.

Also, in the above description, a case was stated in which the pen-type input apparatus 208 was used, but in the image forming apparatus 20, a configuration may also be adopted in which an image of a paper face on which a two-dimensional code 40 is printed is captured using the capturing unit 202, the two-dimensional code 40 included in the captured image is identified by the image recognition process, and this two-dimensional code 40 is decoded to obtain coordinate values (X, Y).

Also, in the image forming apparatus 20, when a specific tone or color hue is removed from the document image 50, and the coordinate detection image 60 is generated using the removed tone or color hue, and these two images are composited and printed on paper, an image of the two-dimensional code 40 is extracted by performing a process that separates an image of the above specific tone or color hue from the captured image received from the pen-type input apparatus 208, or a document image captured using the capturing unit 202.

Also, when, for example, a very large number of the two-dimensional codes 40, such as with an interval of 1 mm, are printed in a matrix on the face of one sheet of paper, when two-dimensional codes 40 positioned on the paper face near the pin tip are successively captured according to a writing operation using the pen-type input apparatus 208, the movement track of the coordinate values (X, Y) thus obtained, for example, becomes information expressing hand-written characters that have been added by writing, or the like. Also, if reference is made to the database 103a by making an inquiry to the management server 10, in addition to a document ID of document to which a written addition has been made, it is possible to identify the number of a page to which a written addition has been made, and also the position of that written addition on the paper face. Thus, by storing the movement track of the coordinate values (X, Y) as written addition information associated in the management server 10 or in another server, it is possible to electronically manage written addition information added to a document that has already been output.

Modified Examples (1) There may be not multiple image forming apparatuses 20, but only one image forming apparatus 20 managed by the management server 10. Also, in the exemplary embodiments described above, a case was described in which the process of assigning the coordinate values (X, Y) and the process of registration in the database 103a are performed in the management server 10, but a configuration may also be adopted in which the process of assigning the coordinate values (X, Y) and the process of registration in the database 103a are performed in an individual image forming apparatus 20, without the management server 10 being provided. In this case, in an individual image forming apparatus 20, the document output from that apparatus 20 is managed using the coordinate values (X, Y) on the imaginary plane 30.

(2) A configuration may also be adopted in which, in the image forming apparatus 20, by operating the operating unit 207, the arrangement interval (for example, an interval of 1.0 mm, 2.5 mm, 10.0 mm, or the like) of the two-dimensional codes 40 can be set for each piece of document, and in the management server 10, in addition to the page number and paper size, based on the arrangement interval of the two-dimensional codes that have been set by the user, the size of the region assigned to each page is determined. In this case, information that indicates the arrangement interval of the two-dimensional codes 40 set in the image forming apparatus 20 is sent to the management server 10 along with the assignment request. Of course, even when the process of assigning the coordinate values (X, Y) and the process of registration in the database 103a are performed in an individual image forming apparatus 20 as stated in Modified Example (1), it is possible to determine the size of an assigned region using the arrangement interval of the two-dimensional codes 40.

(3) A configuration may also be adopted in which the image forming apparatus 20, for example, is provided with a disk drive that controls writing of information to and reading of information from a recording medium such as a DVD or a memory card, and document or the like is input by reading that information from the recording medium using the disk drive, or, conversely, the composite image 70 for output, obtained by compositing the document image 50 and the coordinate detection image 60, is output by writing the composite image 70 for output to the recording medium using the disk drive.

(4) In the exemplary embodiments described above, the management server 10 (computer) performs the process of assigning the coordinate values (X, Y) and the process of registration in the database 103a according to a program installed in the storage unit 103, but a program for realizing these processes performed in the management server 10 may also be provided by communications. Also, such a program may be provided recorded on a computer-readable recording medium, such as a CD-ROM, a DVD, or a memory card. The same is true in a case in which, as stated in Modified Example (1), the process of assigning the coordinate values (X, Y) and the process of registration in the database 103a are performed in an individual image forming apparatus 20.

(5) FIG. 12 is a diagram showing, by way of example, various information registered in the database 103a when the assignment process was performed again for a page that was not properly output due to a problem such as a paper jam or send error. In the example shown in FIG. 12, when performing output of the document (Job ID=1), a paper jam occurred when printing the second page, so only with respect to the second page, a new region [(600,0) to (799,299)] is assigned separate from the previously assigned region [(200,0) to (399, 299)]. Also, with respect to such a page that was not properly output, information indicating the cause of the problem such as "paper jam" is registered in the database 103a as reference information.

(6) In Step S104 of the flowchart shown in FIG. 5, the image forming apparatus 20 may send the assignment request in units of one page, or may send the assignment request in units of multiple pages, but in the case that the assignment request is sent in units of multiple pages, the process of assigning regions in the management server 10 is also performed collectively for multiple pages. When an interruption request for another job was received while collectively performing the assignment process for multiple pages in this manner, in the management server 10, it is possible to suspend the assignment process being executed, and switch to the assignment process for the other job for which there was an interruption request. In this case, when the management server 10 finishes the assignment process for the other job for which there was an interruption request, the management server then restarts the assignment process that was suspended. Also in a case in which an assignment request is made in a unit of multiple pages in this manner, when a problem such as a page jam or a send error occurs in the image forming apparatus 20 so that a page exists that could not be properly output, the assignment request is sent again only with respect to the page for which a problem occurred.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information management apparatus comprising:
   an assignment unit that assigns regions on an imaginary plane for pages of at least one document that is output by at least two image forming apparatuses so that a single region is assigned to each of the pages;
   a receiving unit that receives a request for assignment by the assignment unit, and identification information that identifies the document;
   a notification unit that notifies the image forming apparatus of a coordinate value in the region assigned by the assignment unit, as the coordinate value by a predetermined code to be expressed on a document image of the page;
   a storage unit that stores, for each region assigned by the assignment unit, region information that indicates the region and the identification information, the region information and the identification information being stored associated with each other; and
   a search unit that, when a coordinate value is input, searches for the identification information associated with the region that includes the coordinate value in the storage unit, wherein:
   the imaginary plane is divided into partition regions of a size corresponding to a maximum paper size of recording paper usable by the image forming apparatuses, and an assignment sequence is set for each partition region; and
   the assignment unit, when assigning a region on the imaginary plane for a page of the document, selects an unused partition region according to the assignment sequence, and assigns the region for the page inside the selected unused partition region.

2. The information management apparatus according to claim 1, wherein:
   the imaginary plane is divided into partition regions of a size corresponding to a paper size, for each paper size of recording paper usable by the image forming apparatuses; and
   the assignment unit, when assigning a region on the imaginary plane for a page of the document, selects an unused partition region from among the partition regions of a size corresponding to a paper size of the page, and assigns the selected unused partition region as the region for the page.

3. A non-transitory computer readable medium storing a program that causes a computer to execute:
   assigning regions on an imaginary plane for pages of at least one document that is output by at least two image forming apparatuses so that a single region is assigned to each of the pages;
   generating a code by encoding coordinate values in the assigned region;
   arranging the generated codes onto a document image for each page based on the document and outputting the arranged codes, the output codes being used for a corresponding page;
   storing region information that indicates the region, and identification information for identifying the document in a memory for each of the assigned regions, the region information and the identification information being stored associated with each other; and
   when a coordinate value is input, searching for the identification information associated with the region that includes the coordinate value in the memory, wherein:
   the imaginary plane is divided into partition regions of a size corresponding to a maximum paper size of recording paper usable by the image forming apparatuses, and an assignment sequence is set for each partition region; and
   when assigning a region on the imaginary plane for a page of the document, an unused partition region is selected according to the assignment sequence, and the region for the page inside the selected unused partition region is assigned.

4. The information management apparatus according to claim 1, wherein
   the assignment unit, when assigning a region on the imaginary plane for a page of the document, determines a size of the region that is assigned based on a paper size of the page and an arrangement interval of the codes that is set for the document.

5. The information management apparatus according to claim 1, wherein when the receiving unit again receives an assignment request for any page of the document, with respect to the page for which an assignment request is again received, the assignment unit assigns a new region different from the region that is previously assigned.

6. The information management apparatus according to claim 1, wherein:
   the receiving unit receives an assignment request by a unit of a plurality of pages, and
   the notification unit provides notification of the coordinate value by a unit of a plurality of pages.

7. An image forming system, comprising:
   an assignment unit that assigns regions on an imaginary plane for pages of at least one document that is output by at least two image forming apparatuses so that a single region is assigned to each of the pages;
   a generating unit that generates a code by encoding coordinate values in a region assigned by the assignment unit;
   an output unit that, for each page, arranges and outputs the codes generated by the generating unit onto a document image of the document, the output codes being used for a corresponding page;
   a storage unit that, for each region assigned by the assignment unit, stores region information that indicates the region, and identification information for identifying the document, the region information and the identification information being stored associated with each other; and
   a search unit that, when a coordinate value is input, searches for the identification information associated with the region that includes the coordinate value in the storage unit, wherein:
   the imaginary plane is divided into partition regions of a size corresponding to a maximum paper size of recording paper usable by the image forming apparatuses, and an assignment sequence is set for each partition region; and the assignment unit, when assigning a region on the imaginary plane for a page of the document, selects an unused partition region according to the assignment sequence, and assigns the region for the page inside the selected unused partition region.

8. The image forming system according to claim 7, further comprising:
a capturing unit that captures the image of the document;
an identification unit that performs an image recognition process for the image captured by the capturing unit and thus identifies the code included in the image; and
a decoding unit that decodes a coordinate value from a code that identified by the identification unit, wherein
the search unit searches for information associated with the region that includes the coordinate value decoded by the decoding unit in the storage unit.

9. The image forming system according to claim 7, wherein when an error occurs and any page of the document is output again, with respect to the page for which the error occurred, the assignment unit assigns a new region different from the region that is previously assigned.

10. A method of forming an image, comprising:
assigning regions on an imaginary plane for pages of at least one document that is output by at least two image forming apparatuses so that a single region is assigned to each of the pages;
generating a code by encoding coordinate values in the assigned region;
arranging the generated codes onto a document image for each page based on the document and outputting the arranged codes, the output codes being used for a corresponding page;
storing region information that indicates the region, and identification information for identifying the document in a memory for each of the assigned regions, the region information and the identification information being stored associated with each other; and
when a coordinate value is input, searching for the identification information associated with the region that includes the coordinate value in the memory, wherein:
the imaginary plane is divided into partition regions of a size corresponding to a maximum paper size of recording paper usable by the image forming apparatuses, and an assignment sequence is set for each partition region; and
when assigning a region on the imaginary plane for a page of the document, an unused partition region is selected according to the assignment sequence, and the region for the page inside the selected unused partition region is assigned.

11. A method of managing information, comprising:
assigning regions on an imaginary plane for pages of at least one document that is output by at least two image forming apparatuses so that a single region is assigned to each of the pages; receiving a request for assignment, and identification information that identifies the document;
notifying the image forming apparatus of coordinate values in the assigned region, as coordinate values expressed on a document image of the page using a predetermined code;
storing, for each assigned region, region information that indicates the region and the identification information in a storage unit, the region information and the identification information being stored associated with each other; and
when a coordinate value is input, searching for the identification information associated with the region that includes the coordinate value in the storage unit, wherein:
the imaginary plane is divided into partition regions of a size corresponding to a maximum paper size of recording paper usable by the image forming apparatuses, and an assignment sequence is set for each partition region; and
when assigning a region on the imaginary plane for a page of the document, an unused partition region is selected according to the assignment sequence, and the region for the page inside the selected unused partition region is assigned.

12. An information management apparatus comprising:
an assignment unit that assigns regions on an imaginary plane for pages of at least one document that is output by at least two image forming apparatuses so that a single region is assigned to each of the pages;
a receiving unit that receives a request for assignment by the assignment unit, and identification information that identifies the document;
a notification unit that notifies the image forming apparatus of a coordinate value in the region assigned by the assignment unit, as the coordinate value by a predetermined code to be expressed on a document image of the page;
a storage unit that stores, for each region assigned by the assignment unit, region information that indicates the region and the identification information, the region information and the identification information being stored associated with each other; and
a search unit that, when a coordinate value is input, searches for the identification information associated with the region that includes the coordinate value in the storage unit, wherein:
the imaginary plane is divided into partition regions of a size corresponding to a paper size, for each paper size of recording paper usable by the image forming apparatuses; and
the assignment unit, when assigning a region on the imaginary plane for a page of the document, selects an unused partition region from among the partition regions of a size corresponding to a paper size of the page, and assigns the selected unused partition region as the region for the page.

13. An image forming system, comprising:
an assignment unit that assigns regions on an imaginary plane for pages of at least one document that is output by at least two image forming apparatuses so that a single region is assigned to each of the pages;
a generating unit that generates a code by encoding coordinate values in a region assigned by the assignment unit;
an output unit that, for each page, arranges and outputs the codes generated by the generating unit onto a document image of the document, the output codes being used for a corresponding page;
a storage unit that, for each region assigned by the assignment unit, stores region information that indicates the region, and identification information for identifying the document, the region information and the identification information being stored associated with each other; and
a search unit that, when a coordinate value is input, searches for the identification information associated with the region that includes the coordinate value in the storage unit, wherein:

the imaginary plane is divided into partition regions of a size corresponding to a paper size, for each paper size of recording paper usable by the image forming apparatuses; and the assignment unit, when assigning a region on the imaginary plane for a page of the document, selects an unused partition region from among the partition regions of a size corresponding to a paper size of the page, and assigns the selected unused partition region as the region for the page.

14. A non-transitory computer readable medium storing a program that causes a computer to execute:

assigning regions on an imaginary plane for pages of at least one document that is output by at least two image forming apparatuses so that a single region is assigned to each of the pages;

generating a code by encoding coordinate values in the assigned region;

arranging the generated codes onto a document image for each page based on the document and outputting the arranged codes, the output codes being used for a corresponding page;

storing region information that indicates the region, and identification information for identifying the document in a memory for each of the assigned regions, the region information and the identification information being stored associated with each other; and when a coordinate value is input, searching for the identification information associated with the region that includes the coordinate value in the memory, wherein:

the imaginary plane is divided into partition regions of a size corresponding to a paper size, for each paper size of recording paper usable by the image forming apparatuses; and when assigning a region on the imaginary plane for a page of the document, an unused partition region from among the partition regions of a size corresponding to a paper size of the page is selected, and the selected unused partition region is assigned as the region for the page.

15. A method of forming an image, comprising:

assigning regions on an imaginary plane for pages of at least one document that is output by at least two image forming apparatuses so that a single region is assigned to each of the pages;

generating a code by encoding coordinate values in the assigned region;

arranging the generated codes onto a document image for each page based on the document and outputting the arranged codes, the output codes being used for a corresponding page;

storing region information that indicates the region, and identification information for identifying the document in a memory for each of the assigned regions, the region information and the identification information being stored associated with each other; and when a coordinate value is input, searching for the identification information associated with the region that includes the coordinate value in the memory, wherein:

the imaginary plane is divided into partition regions of a size corresponding to a paper size, for each paper size of recording paper usable by the image forming apparatuses; and when assigning a region on the imaginary plane for a page of the document, an unused partition region from among the partition regions of a size corresponding to a paper size of the page is selected, and the selected unused partition region is assigned as the region for the page.

16. A method of managing information, comprising:

assigning regions on an imaginary plane for pages of at least one document that is output by at least two image forming apparatuses so that a single region is assigned to each of the pages; receiving a request for assignment, and identification information that identifies the document;

notifying the image forming apparatus of coordinate values in the assigned region, as coordinate values expressed on a document image of the page using a predetermined code;

storing, for each assigned region, region information that indicates the region and the identification information in a storage unit, the region information and the identification information being stored associated with each other; and when a coordinate value is input, searching for the identification information associated with the region that includes the coordinate value in the storage unit, wherein:

the imaginary plane is divided into partition regions of a size corresponding to a paper size, for each paper size of recording paper usable by the image forming apparatuses; and when assigning a region on the imaginary plane for a page of the document, an unused partition region from among the partition regions of a size corresponding to a paper size of the page is selected, and the selected unused partition region is assigned as the region for the page.

* * * * *